(12) United States Patent
Zhang et al.

(10) Patent No.: US 7,333,605 B1
(45) Date of Patent: Feb. 19, 2008

(54) ACOUSTIC ECHO CANCELLATION WITH ADAPTIVE STEP SIZE AND STABILITY CONTROL

(75) Inventors: Ming Zhang, Cupertino, CA (US); Kuoyu Lin, San Jose, CA (US)

(73) Assignee: Fortemedia, Inc., Cupertino, CA (US)

( * ) Notice: Subject to any disclaimer, the term of this patent is extended or adjusted under 35 U.S.C. 154(b) by 1192 days.

(21) Appl. No.: 10/193,739

(22) Filed: Jul. 10, 2002

Related U.S. Application Data (60) Provisional application No. 60/375,923, filed on Apr. 27, 2002.

(51) Int. Cl.
*H04M 9/08* (2006.01)
(52) U.S. Cl. .................... 379/406.08; 370/286
(58) Field of Classification Search ............... None
See application file for complete search history.

(56) References Cited

U.S. PATENT DOCUMENTS

| | | | | |
|---|---|---|---|---|
| 6,236,725 B1 * | 5/2001 | Takada et al. | ......... | 379/406.01 |
| 6,707,912 B2 * | 3/2004 | Stephens et al. | ....... | 379/406.08 |
| 6,950,842 B2 * | 9/2005 | Lis | .............. | 708/322 |
| 7,099,460 B1 * | 8/2006 | Shraga et al. | .......... | 379/406.08 |

OTHER PUBLICATIONS

Antweiler et al, "Approximation of Optimal Step Size Control for Acoustic Echo Cancellation", 1997, IEEE Int. Conf. on Acoustics, Speech, and Signal Processing, ICASSP-'97, Apr. 21-24, 1997, vol. 1, pp. 295-298.*

* cited by examiner

*Primary Examiner*—Ramnandan Singh
(74) *Attorney, Agent, or Firm*—Thomas, Kayden, Horstemeyer & Risley (57) ABSTRACT

An acoustic echo canceller having an adaptive filter, a step size control unit, and (optionally) a stability control unit. The adaptive filter derives an estimate of the echo in a near-end signal using a digital filter (e.g., a FIR filter) and further cancels the echo estimate from the near-end signal to provide an output signal. The step size control unit derives step sizes to be used to adjust the coefficients of the digital filter. The step sizes are determined based on the characteristics of a reference signal and the output signal and (optionally) the characteristics of the coefficients. For example, the step size is set proportional to the reference signal amplitude, inversely proportional to the output signal amplitude, and based on a difference in the coefficient power at two different time instants. The stability control unit constrains the adjustments to the coefficients to prevent instability.

22 Claims, 7 Drawing Sheets

ACOUSTIC ECHO CANCELLATION WITH ADAPTIVE STEP SIZE AND STABILITY CONTROL

CROSS-REFERENCES TO RELATED APPLICATIONS

This application claims the benefit of provisional U.S. Application Ser. No. 60/375,923, entitled "Channel Control and Post Filter for Acoustic Echo Cancellation," filed Apr. 27, 2002, which is incorporated herein by reference in its entirety for all purposes.

This application is further related to U.S. application Ser. No. 10/193,689, entitled "Channel Control and Post Filter for Acoustic Echo Cancellation," filed on the same day herewith and incorporated herein by reference in its entirety for all purposes.

BACKGROUND OF THE INVENTION

The present invention relates generally to signal processing, and more specifically to techniques for canceling acoustic echo using an adaptive filter with adaptive step size and stability control.

Full-duplex hands-free communication systems are used for commonly many applications, such as speakerphone, hands-free car kit, teleconferencing system, cellular phone, and so on. For each of these systems, one or more microphones in the system picks up an acoustic signal emitted by a speaker and its reflections from the borders of an enclosure, such as a room or a car compartment. The propagation path for the reflections may change due to various factors such as, for example, movements of the microphone, loudspeaker, and/or speaker/user, volume change on the loudspeaker, and environment changes. As a result, electroacoustic circuit in the system may become unstable and produce howling. In the case of a telecommunication system, users are also annoyed by listening their own voice, which is delayed by the path of the system. This acoustic disturbance is referred to as echo.

Echo cancellation is often required in many communication systems to suppress or eliminate echo as well as remove howling effect. For example, echo cancellation is typically used in a hands-free full-duplex environment, such as a vehicle or a room, where the speaker and microphone may be located some distance away from a user. Conventionally, echo cancellation is achieved by a circuit that employs an adaptive filter.

The adaptive filter performs echo cancellation by deriving an estimate of the echo based on a reference signal, which may be a line input from a communication or telematics device such as a cellular phone or some other device. This reference signal is filtered based on a set of filter coefficients or weights to derive the estimate of the echo, which is then subtracted from a near-end signal that includes the echo to be suppressed. The filter coefficients are typically "trained" (or adapted or updated) based on a least mean square (LMS) algorithm or a normalized least mean square (NLMS) algorithm. If the filter coefficients are effectively trained, then a more accurate estimate of the echo may be obtained and improved echo suppression can be achieved.

The training of the filter coefficients is typically controlled based on four different situations: only near-end user talking, only far-end user talking, both near-end and far-end users talking simultaneously, and both near-end and far-end users silent. The third situation is often referred to as double-talk. The near-end user is the one located near a microphone or a speakerphone at one end of the communication system, and the far-end user is the one located at the other end of the system and remote from the near-end user. The echo suppression is performed so that the far-end user hears only the speech from the near-end user and not the echo resulting from reflections of the far-end user's speech back to the microphone.

Typically, the filter coefficients are trained when far-end talk is present. The coefficients are then fixed (i.e., not adapted) otherwise. After the training, the coefficients are used to estimate and cancel echo from the far-end user's speech. The rate at which the coefficients are adjusted during training is determined by a step size parameter. A small step size results in a slow convergence rate for the adaptive filter, which may be unacceptable for fast changing environments (e.g., fast changes in the echo path). Conversely, a large step size results in a faster convergence rate for the adaptive filter when only far-end talk is present. However, the filter coefficients may become unstable or diverge if the selected step size is too large for adapting when near-end talk is present and/or the near-end noise is strong. A common method for avoiding this non-convergence problem is to pause the training of the filter coefficients whenever double-talk or only near-end talk is detected.

Double-talk is typically detected based on a cross-correlation of the near-end signal and the echo estimate (or the reference signal from the far-end user). Techniques for detecting double-talk are described in various references including (1) U.S. Pat. Nos. 5,418,848, 5,732,134, 6,108,412, 6,192,126 B1, and 6,269,161 B1, (2) European Patent Nos. EP-B1-0,053,202, EP-A2-0,439,139, and EP-A-0,454,242, (3) papers by H. Y e and B. X. Wu, "A New Double-Talk Detection Algorithm Based on the Orthogonality Theorem," IEEE Trans. Communications, Vol. 39, 1542-1545, 1991, J. Benesty, et al., "A Family of Double-Talk Detectors Based on Cross-Correlation," Proceedings of the IWAENC'99, Pocono Menor, Pa., USA, pp. 108-111, 1999, and K. Ghose and V. U. Reddy, "A Double-Talk Detector for Acoustic Echo Cancellation Applications," Signal Processing, Vol. 80, pp. 1459-1467, 2000. In general, it is very difficult to reliably detect double-talk in many practical operating scenarios.

A technique to estimate so-called optimal step size for adjusting the filter coefficients based on an artificial delay of the filter coefficients are described in papers by C. Breining, et al., "Acoustic Echo Control—an Application of Very High-Order Adaptive Filters," IEEE Signal Processing Magazine, July 1999, and A. Mader, et al., "Step-Size Control for Acoustic Echo Cancellation Filters—an Overview," Signal Processing, Vol. 80, pp. 1697-1719, 2000. However, this technique introduces a delay that is undesired for many communication applications. Moreover, the step size obtained by this method may lead to the freezing of the coefficient training when the echo path changes, which is also undesirable.

As can be seen, techniques that can properly adjust the step size for the coefficients of an adaptive filter and which can improve convergence and avoid instability for acoustic echo cancellation are highly desirable.

SUMMARY OF THE INVENTION

Techniques are provided herein to cancel acoustic echo using adaptive step size and stability control to improve echo cancellation performance. These techniques may be used to avoid the need for a double-talk detector to control the training of the adaptive filter. These techniques may also be used to prevent deleterious effects, such as howling disaster, under abnormal operating scenarios.

A specific embodiment of the invention provides an acoustic echo canceller having an adaptive filter and a step size control unit. The adaptive filter receives a reference signal and a near-end signal, derives an estimate of the echo in the near-end signal using a digital filter (e.g., a FIR filter), and cancels the echo estimate from the near-end signal to provide an output signal. The step size control unit receives the reference and output signals and (optionally) the coefficients of the digital filter. The step size control unit then derives a step size signal indicative of one or more step sizes to be used to adjust the coefficients of the digital filter. The step sizes are determined based on the characteristics of the reference and output signals and (optionally) the characteristics of the coefficients.

In an embodiment, the step size is set proportional to the amplitude of the reference signal and inversely proportional to the amplitude of the output signal. For example, the step size may be set proportional to the ratio of the power of the reference signal to the power of the output signal. The step size may further be set based on a combination of the powers of different portions of the coefficients.

The echo canceller may further include a stability control unit that receives initial adjustments for the coefficients of the digital filter and provides modified adjustments. The initial adjustments may be derived based on, for example, an NLMS algorithm. The initial adjustments may then be constrained to prevent instability. For example, the initial adjustments may be reduced if the amount of adjustment to the coefficients exceeds a first threshold value, and the modified adjustments may be set to zero if the amount of adjustment exceeds a second threshold value. The amount of adjustment to the coefficients may be quantified, for example, by the norm of the coefficients. The coefficients are then updated based on the modified adjustments instead of the initial adjustments.

Various other aspects, embodiments, and features of the invention are also provided, as described in further detail below.

The foregoing, together with other aspects of this invention, will become more apparent when referring to the following specification, claims, and accompanying drawings.

DESCRIPTION OF THE SPECIFIC EMBODIMENTS

For clarity, various signals and controls for the acoustic echo cancellation systems described herein are labeled with either lower case or upper case symbols. Time-variant signals and controls are labeled with "(n)", where n denotes sample time. Lower case symbols (e.g., r(n)) are used to denote scalars, and upper case symbols (e.g., W(n)) are used to denote vectors. The operations shown in the figures may be scalar operations (if both input operands are denoted with lower case symbols) or vector operations (if at least one input operand is denoted with an upper case symbol).

Figure 1:
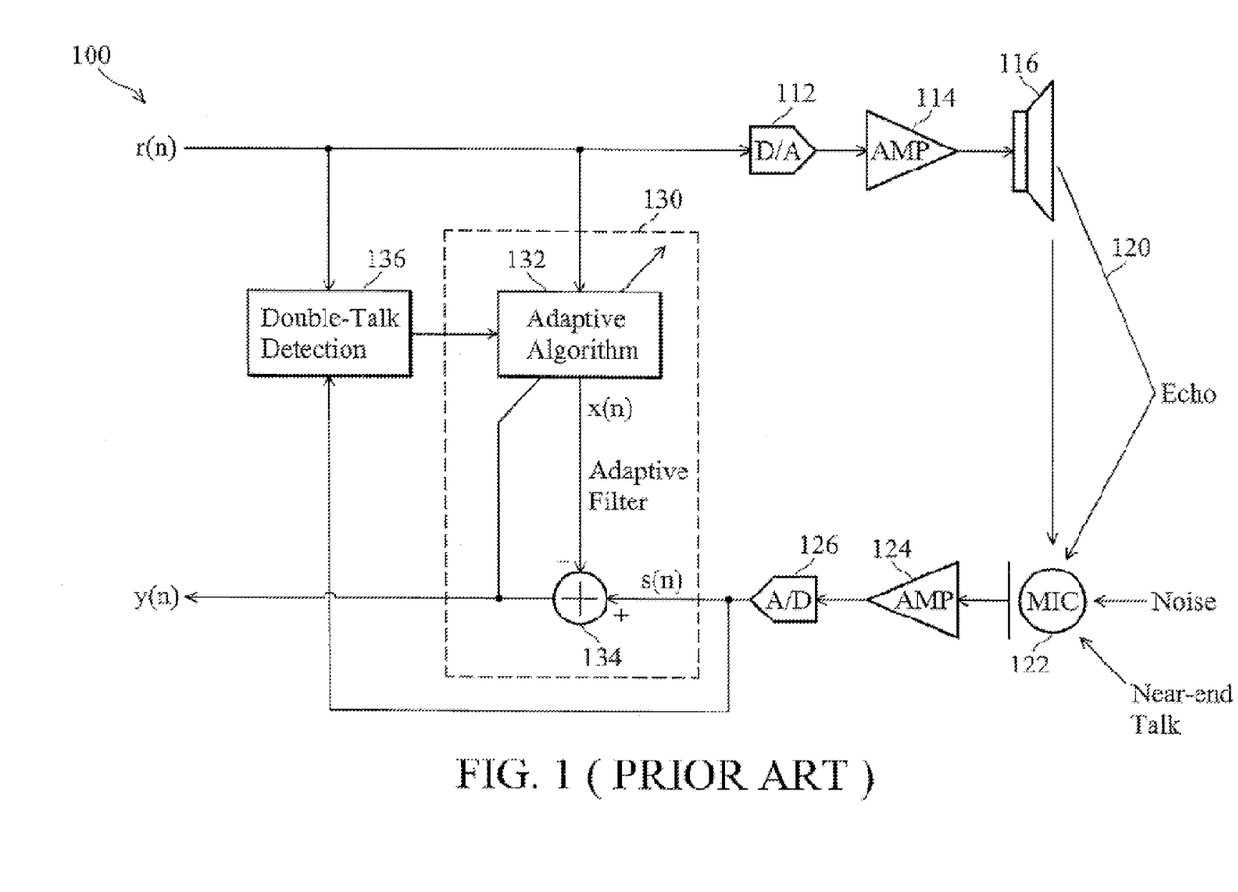
FIG. 1 is a diagram of a conventional echo cancellation system.

FIG. 1 is a diagram of a conventional echo cancellation system 100. In the "output path", a digital signal r(n), which includes audio activity (e.g., speech) from a far-end source, is converted to an analog signal by a digital-to-analog (D/A) converter 112, amplified by a power amplifier 114, and outputted from a speaker 116 to one or more near-end users. A far-end user is one who is located away (or remote) from system 100, and a near-end user is one who is located within the vicinity of system 100. The far-end signal r(n) is also used as a reference signal for an adaptive filter 130.

In the "input path", a microphone 122 receives audio activity from the near-end user (i.e., near-end voice or talk), local ambient noise, and echo from speaker 116 via an echo path 120. The signal from microphone 122 is amplified by an amplifier 124 and further digitized by an analog-to-digital (A/D) converter 126 to provide a digitized near-end signal s(n).

To cancel echo due to the far-end signal r(n) on the near-end signal s(n), a double-talk detection unit 136 receives and processes the far-end signal and the near-end signal to determine whether or not double-talk exists. Near-end talk refers to audio activity (e.g., speech) from a near-end user, far-end talk refers to audio activity from a far-end user, and double-talk refers to a situation when both near-end talk and far-end talk are present. For a teleconference system, the near-end talk may come from users within the room where the teleconference system is installed, and the far-end talk may come from users outside the room. Double-talk detection unit 136 then provides a control signal to adaptive filter 130. This control signal indicates whether double-talk or only far-end talk is present, and is used to control the training of the adaptive filter.

Adaptive filter 130 receives the reference signal r(n), the control signal from double-talk detection unit 136 and the near-end signal s(n), and generates an output signal y(n). Adaptive filter 130 filters the reference signal r(n) with a digital filter to provide an estimate of the echo in the near-end signal s(n). The echo estimate signal x(n) is then subtracted from the near-end signal s(n) by a summer 134 to obtain the output signal y(n). The output signal y(n) is then fed back to adaptive algorithm 132 to update the coefficients of the filter. If the echo cancellation by adaptive filter 130 is effective, then the echo estimate signal x(n) is approximately equal to the near-end signal s(n) when only far-end talk is present, and the error in the output signal y(n) would be small.

An adaptive algorithm 132 within adaptive filter 130 includes the digital filter and a control unit used to update the coefficients of the digital filter via the output signal y(n). The digital filter is typically implemented as a finite impulse response (FIR) filter that has an impulse response determined by a set of coefficients. These coefficients are updated based on a particular adaptive algorithm (e.g., an LMS or NLMS algorithm) when only far-end talk is detected, i.e., when the near-end signal s(n) includes mostly the echo from the far-end (or reference) signal r(n).

The filter coefficients are adjusted based on a step size parameter during training. Typically, a fixed step size is used, and the magnitude of this step size affects the performance of the adaptive filter. In particular, if a small step size is selected, then the convergence rate is slow and the adaptive filter may not be able to track fast changes in the echo path. Conversely, if a large step size is selected, then the filter coefficients may diverge if only near-end talk is present and/or if the near-end noise is strong. These phenomena are highly undesirable.

Figure 2:
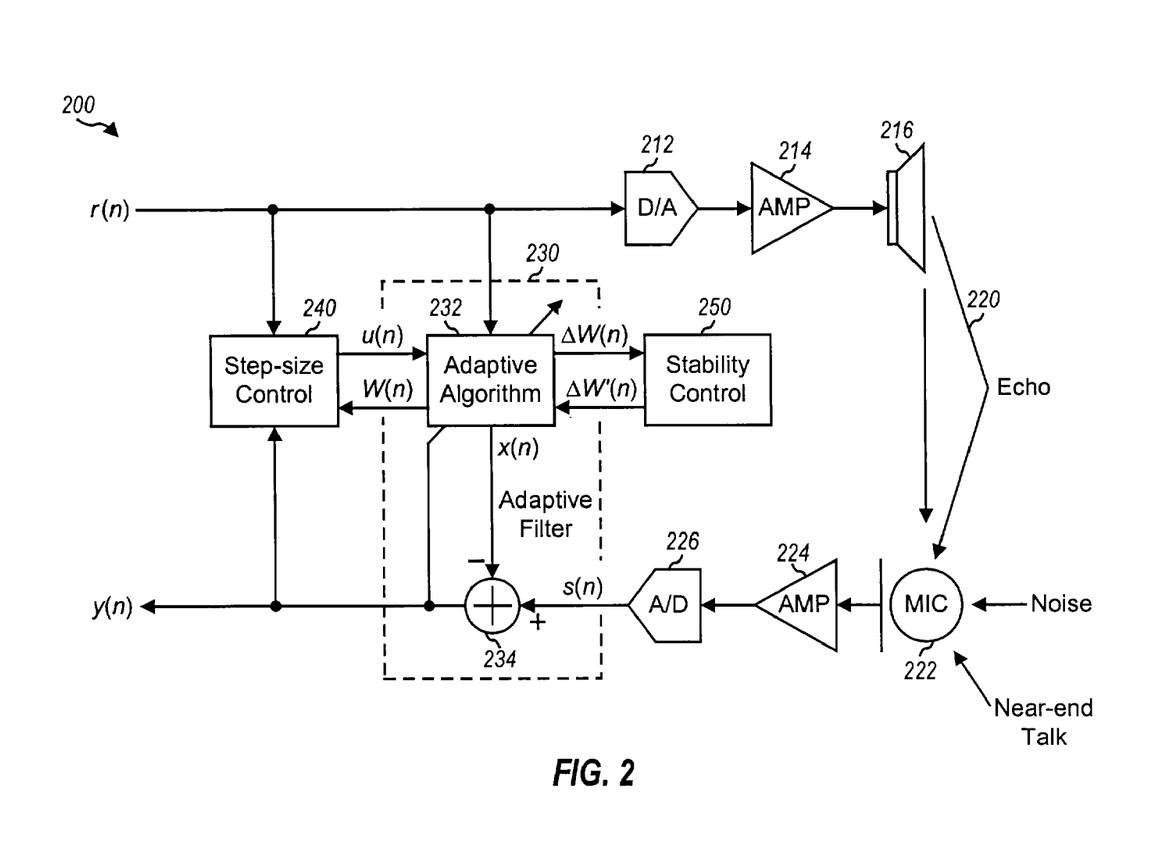
FIG. 2 is a diagram of an echo cancellation system, which is a specific embodiment of the present invention.

FIG. 2 is a diagram of an echo cancellation system 200, which is a specific embodiment of the present invention. In the output path, the far-end signal r(n), which includes audio activity from a far-end source, is converted to an analog signal by a D/A converter 212, amplified by a power amplifier 214, and outputted from a speaker 216 to one or more near-end users. The far-end signal r(n) is also used as the reference signal for an adaptive filter 230 and is also provided to a step size control unit 240.

In the input path, a microphone 222 receives near-end voice, local ambient noise, and echo from speaker 216 via an echo path 220. The signal received by microphone 222 is amplified by an amplifier 224 and further digitized by an A/D converter 226 to provide the near-end signal s(n).

Adaptive filter 230 receives the reference signal r(n), the step size signal u(n) from step-size control unit 240 and the near-end signal s(n), and generates the output signal y(n). The output signal y(n) is then fed back to adaptive algorithm 232 to update the coefficients of the filter. Adaptive filter 230 then filters the reference signal r(n) with a digital filter to provide an estimate of the echo in the near-end signal s(n). The echo estimate signal x(n) is then subtracted from the near-end signal s(n) by a summer 234 to provide the output signal y(n).

An adaptive algorithm 232 within adaptive filter 230 includes the digital filter and a control unit used to update the coefficients of the digital filter via the output signal y(n). In an embodiment, the digital filter is implemented as a FIR filter having an impulse response determined by a set of coefficients, which is denoted by a coefficient vector W(n).

Adaptive algorithm 232 further receives a step size signal u(n) from step size control unit 240 and a "modified" coefficient adjustment vector ΔW'(n) from a stability control unit 250 and uses these various inputs to adjust the filter coefficients. These coefficients are updated in accordance with a particular adaptive algorithm.

Step size control unit 240 receives the reference signal r(n), the output signal y(n), and the filter coefficients W(n). Step size control unit 240 then processes these inputs to provide the step size signal u(n), which is indicative of one or more step sizes used to control the updating of the filter coefficients by adaptive algorithm 232. In particular, the step size u(n) determines the amount of adjustment for the filter coefficients and thus the convergence rate of the coefficients. Since the step size u(n) is dynamically set, the filter coefficients may be updated at all times (e.g., even when double-talk is detected). The step size u(n) is typically a smaller value when double-talk exists and a larger value when only far-end talk is present.

Stability control unit 250 receives an initial coefficient adjustment vector ΔW(n) from adaptive algorithm 232 and provides the modified coefficient adjustment vector ΔW'(n). The vector ΔW(n) is indicative of the amount of adjustment to be made to each filter coefficient and is derived, for example, based on the NLMS algorithm by the adaptive algorithm 232. However, under certain operating conditions, it is better (e.g., to ensure stability) to not apply the initial coefficient adjustments ΔW(n) determined by the adaptive algorithm. When such conditions arise, stability control unit 250 modifies the initial coefficient adjustment vector such that stability is ensured. The modified coefficient adjustment vector ΔW'(n) may thus be equal to the initial coefficient adjustment vector ΔW(n) or a modified version of the vector ΔW(n).

Adaptive filter 230, step size control unit 240, and stability control unit 250 are described in further detail below.

Figure 3:
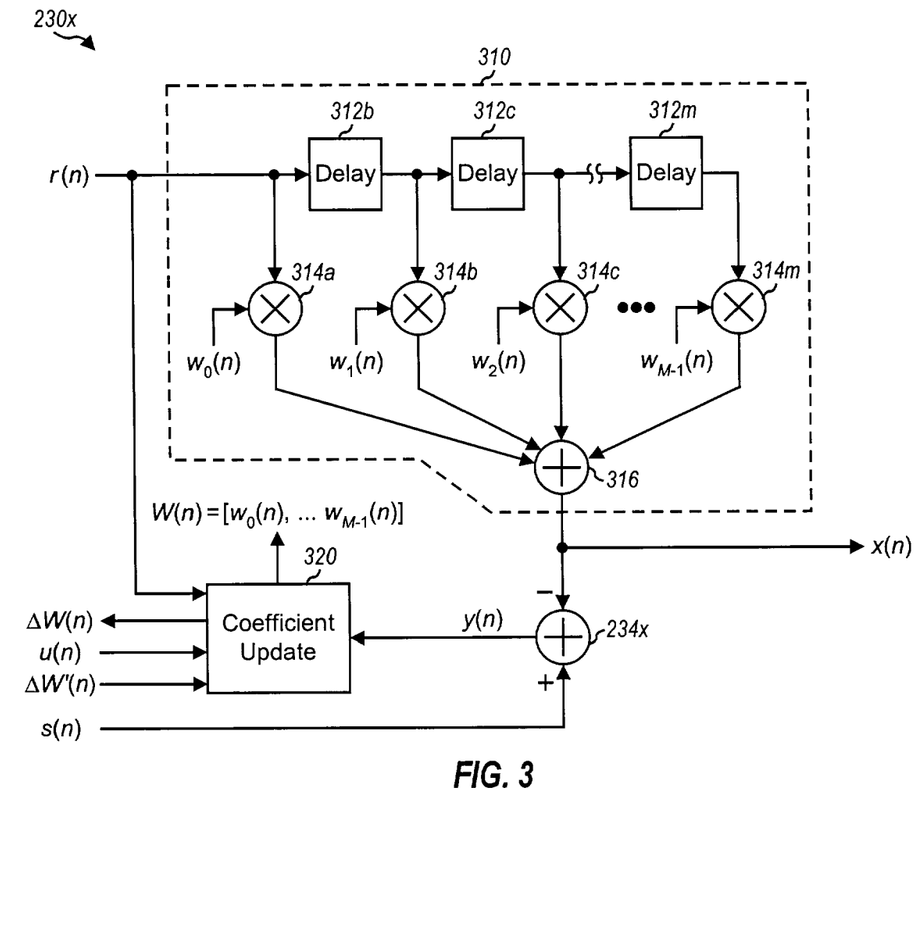
FIG. 3 is a diagram of an adaptive filter.

FIG. 3 is a diagram of an adaptive filter 230x, which is a specific embodiment of adaptive filter 230 in FIG. 2. In this embodiment, adaptive filter 230x includes an M-tap FIR filter 310, a summer 234x (which corresponds to summer 234 in FIG. 2), and a coefficient update unit 320. An infinite impulse response (IIR) filter or some other filter architecture may also be used in place of the FIR filter, and is within the scope of the invention. Coefficient update unit 320 is the control unit for adaptive filter 230x.

Within FIR filter 310, the digital samples for the reference signal r(n) are provided to a number of (M−1) delay elements 312b through 312m, which are coupled in series. Each delay element 312 provides one sample period of delay. The reference signal r(n) and the outputs of delay elements 312b through 312m are provided to multipliers 314a through 314m, respectively. Each multiplier 314 also receives a respective coefficient $w_i(n)$ from coefficient update unit 320, scales the received sample r(n−i) with the coefficient $w_i(n)$, and provides the scaled sample to a summer 316. For each sample period n, summer 316 sums the M scaled samples from multipliers 314a through 314m to provide a filtered sample for that sample period. The filtered sample for sample period n, x(n), may be computed as:

$$x(n) = \sum_{i=0}^{M-1} w_i^* r(n-i),$$  Eq (1)

where the symbol (*) denotes a complex conjugate and M is the number of taps of FIR filter 310. Equation (1) may also be written in vector form, as follows:

$$x(n) = W^T(n)R(n),$$

where $W(n) = [w_0(n), w_1(n), \ldots w_{M-1}(n)]^T$, $R(n) = [r(n), r(n-1), \ldots r(n-M+1)]^T$, and "T" denotes a vector transposition. The signal x(n) comprises a sequence of filtered samples, one filtered sample for each sample period, with each filtered sample being derived as shown in equation (1).

Summer 234x receives and subtracts the signal x(n) from the signal s(n) to provide the output signal y(n).

Coefficient update unit 320 provides the set of M coefficients for FIR filter 310, which is denoted as the vector W(n), and further updates these coefficients based on a particular adaptive algorithm. This adaptive algorithm may be a least mean square (LMS) algorithm, a normalized least mean square (NLMS), a recursive least square (RLS) algorithm, a direct matrix inversion (DMI) algorithm, or some other adaptive algorithm. Each of the LMS, NLMS, RLS, and DMI algorithms (directly or indirectly) attempts to minimize the mean square error (MSE) of the output signal y(n) during the training period. This error may be expressed as:

$$y(n) = s(n) - x(n).$$  Eq (2)

The output signal y(n) may thus be viewed as an error signal during the training period.

The filter coefficients may be updated as follows:

$$W(n) = W(n-1) + \Delta W(n),$$  Eq (3)

where W(n−1) is the coefficient vector for the prior sample period, ΔW(n) is the coefficient adjustment vector, and W(n) is the coefficient vector for the current sample period. For the NLMS algorithm, the adjustment vector ΔW(n) may be derived as follows:

$$\Delta W(n) = \frac{u(n) \cdot y(n) \cdot R(n)}{|R(n)|^2}, \qquad \text{Eq (4)}$$

where u(n) is the step size for the adaptive filter, and $|R(n)|^2$ is related to the power of the reference signal r(n) and may be derived as:

$$|R(n)|^2 = R^T(n)R(n). \qquad \text{Eq (5)}$$

The NLMS and other algorithms are described in detail by B. Widrow and S. D. Sterns in a book entitled "Adaptive Signal Processing," Prentice-Hall Inc., Englewood Cliffs, N.J., 1986. The LMS, NLMS, RLS, DMI, and other adaptive algorithms are described in further detail by Simon Haykin in a book entitled "Adaptive Filter Theory", 3rd edition, Prentice Hall, 1996. The pertinent sections of these books are incorporated herein by reference.

For system 100 in FIG. 1, double talk detection circuit 136 is used to control the updating of the filter coefficients. In particular, the step size u(n) is a positive constant when only far-end talk is detected and is set to zero when double-talk or only near-end talk is detected.

As shown in FIG. 3, coefficient update unit 320 receives the reference signal r(n), the output signal y(n), and the step size signal u(n) from step size control unit 240. Coefficient update unit 320 then derives the coefficient adjustment vector ΔW(n) as shown in equation (4). In an embodiment, instead of using the adjustment vector ΔW(n) directly to update the coefficient vector W(n), as shown in equation (3), the adjustment vector ΔW(n) is instead provided to stability control unit 250. Unit 250 may modify the adjustment vector ΔW(n) based on the operating conditions to ensure stability. Stability control unit 250 would then provide the modified coefficient adjustment vector ΔW'(n) to coefficient update unit 320, which then uses this vector to update the coefficient vector W(n), as follows:

$$W(n) = W(n-1) + \Delta W'(n). \qquad \text{Eq (6)}$$

Figure 4:
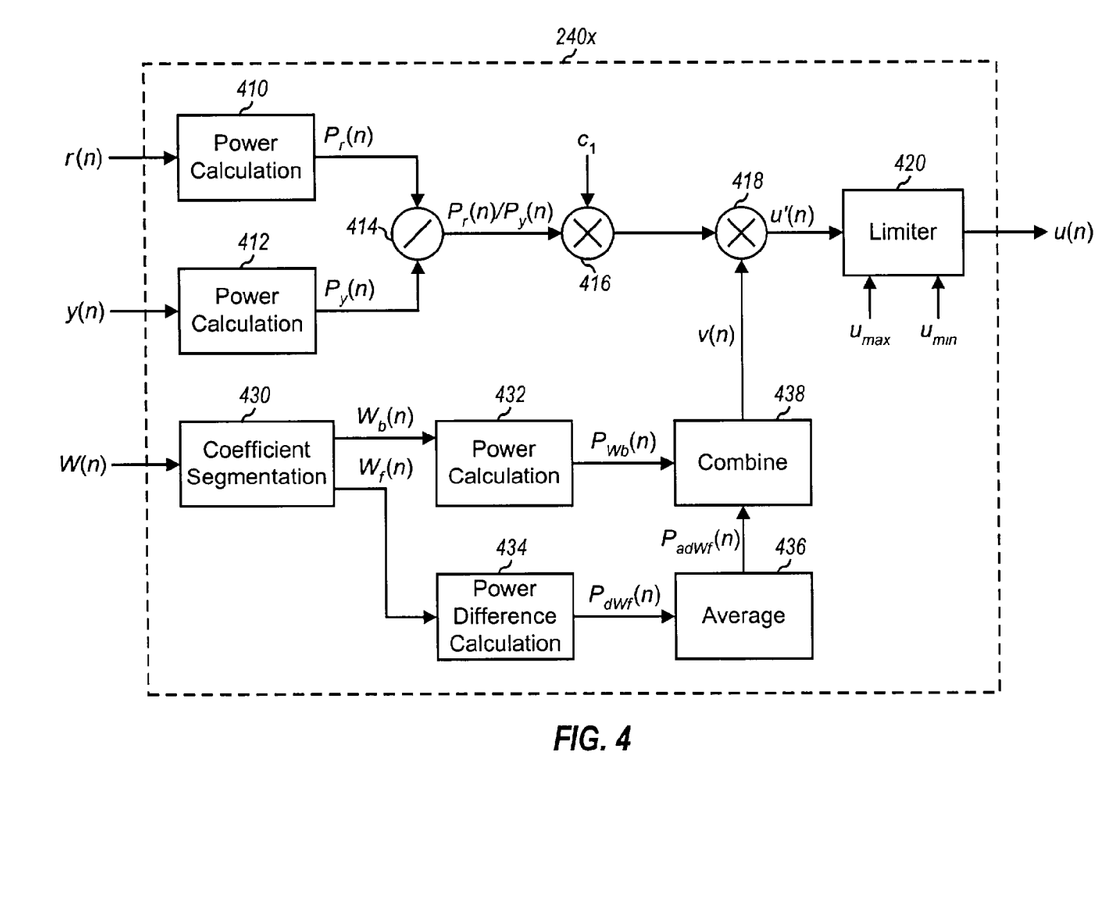
FIG. 4 is a diagram of a step size control unit.

FIG. 4 is a diagram of a step size control unit 240x, which is a specific embodiment of step size control unit 240 in FIG. 2. In an embodiment, the step size u(n) for adjusting the filter coefficients is determined based on the reference signal r(n), the output signal y(n), and the filter coefficients W(n). In general, the step size is set larger if the far-end signal amplitude is large and set smaller if the output signal amplitude is large (which is the case when double-talk or only near-end talk is present). Moreover, the step size is set larger if the filter coefficients are changing more dynamically, as described below. The step size may also be set based on fewer, additional, or different parameters, and this is also within the scope of the invention.

For the specific embodiment shown in FIG. 4, the step size u(n) is set based on the ratio of the far-end signal power over the output signal power. Within step size control unit 240x, the reference signal r(n) and the output signal y(n) are provided to power calculation units 410 and 412, respectively. Each power calculation unit calculates the average power of its received signal. In particular, the average power $P_r(n)$ of the reference signal r(n) and the average power $P_y(n)$ of the output signal y(n) may be computed as follows:

$$P_r(n) = \alpha \cdot P_r(n-1) + (1-\alpha) \cdot r^2(n), \text{ and} \qquad \text{Eq (7a)}$$

$$P_y(n) = \alpha \cdot P_y(n-1) + (1-\alpha) \cdot y^2(n), \qquad \text{Eq (7b)}$$

where α is a "forgetting" factor for the power computation. As shown in equations (7a) and (7b), the power of each signal for sample period n is first computed as either $r^2(n)$ or $y^2(n)$. The power of each signal is then exponentially averaged. The factor α is a time constant for the exponential averaging, with a large value for α corresponding to a longer time constant and a small value for α corresponding to a shorter time constant. The average power may also be computed using linear averaging or some other suitable averaging scheme, and this is within the scope of the invention.

A divider 414 then divides the reference signal power $P_r(n)$ by the output signal power $P_y(n)$ and provides a power ratio $P_r(n)/P_y(n)$. A multiplier 416 then receives and scales the power ratio $P_r(n)/P_y(n)$ with a scaling factor $c_1$ to provide a scaled power ratio $c_1 P_r(n)/P_y(n)$. The scaling factor $c_1$ determines the weight (i.e., the amount of contribution) the power ratio $P_r(n)/P_y(n)$ will have on the step size u(n), and may be determined empirically or via simulation to achieve the desired results.

For the specific embodiment shown in FIG. 4, the step size u(n) is further set based on the characteristics of the filter coefficients. By analyzing the behavior of the filter coefficients during and after the training period, various characteristics may be observed and used to better control the adjustment of the coefficients.

Figure 6:
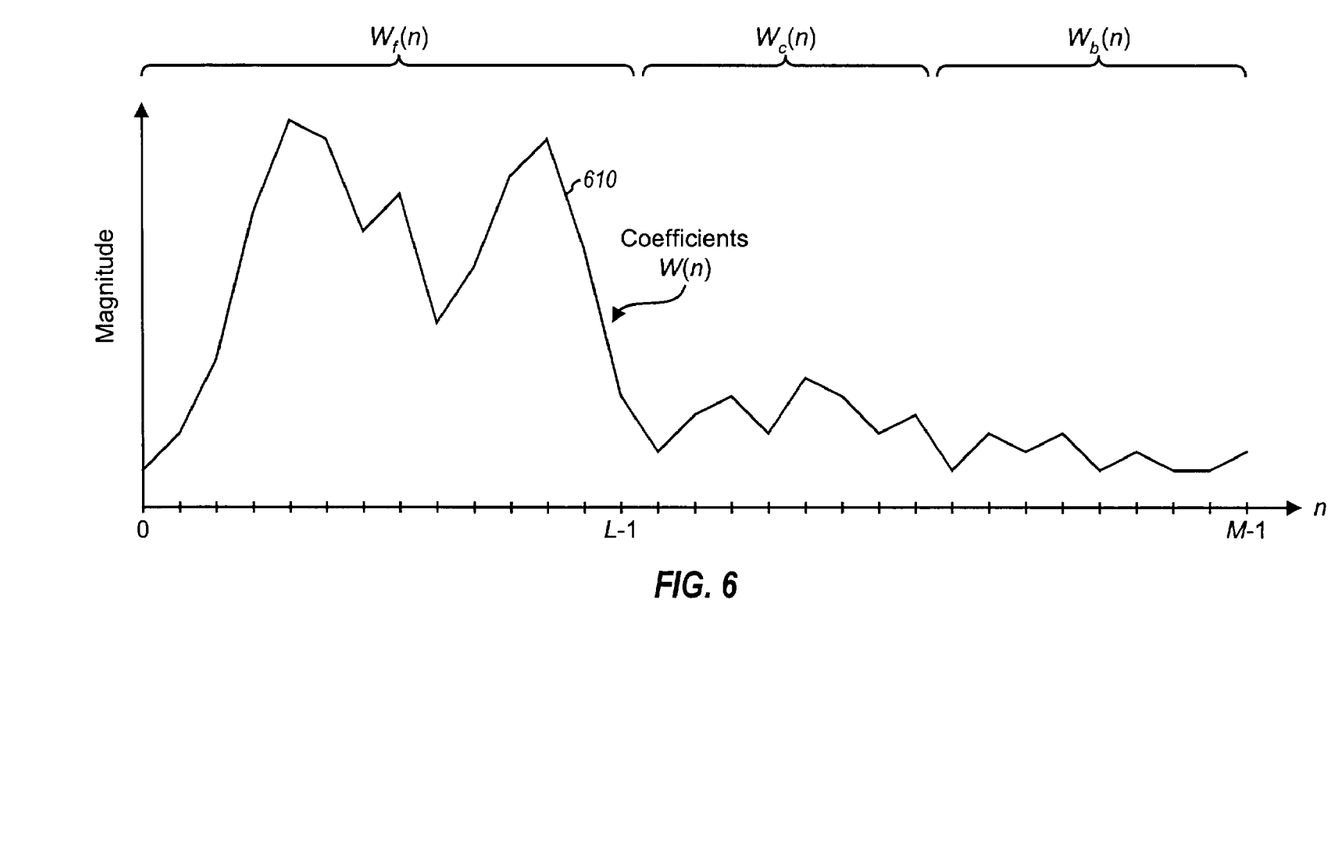
FIG. 6 is a diagram illustrating the filter coefficients for the adaptive filter in an example scenario.

FIG. 6 is a diagram illustrating the filter coefficients for an adaptive filter in an example scenario. In FIG. 6, the magnitude of the M filter coefficients (i.e., $|w_0(n)|$, $|w_i(n)|$, ... $|w_i(n)|$, ... and $|w_{M-1}(n)|$) is shown by a plot 610. As can be seen, the coefficients with larger amplitudes tend to be those with smaller indices, and the coefficients with larger indices tend to have smaller amplitudes. This is because the strong echo components tend to be those with shorter propagation delays. Moreover, at the beginning of training (e.g., whenever the environment changes), the coefficients with small indices tend to change more dynamically (i.e., the amplitude swing of the coefficient adjustment is large). If the number of coefficients M is chosen large enough to cover the impulse response of the echo path, then the coefficients with large indices will tend to be small after the adaptive filter converges. The step size u(n) may be set based on these various characteristics of the filter coefficients to improve convergence and performance.

The coefficient vector W(n) is segmented into three segments, $W_f(n)$, $W_b(n)$ and $W_c(n)$. The front segment $W_f(n)$ includes the first L coefficients in the vector W(n) and is denoted as a vector $W_f(n) = [w_0(n), w_1(n), \ldots w_{L-1}(n)]^T$. The back segment $W_b(n)$ includes the last N coefficients in the vector W(n) and is denoted as a vector $W_b(n) = [w_{M-N}(n), w_{M-N+1}(n), \ldots w_{M-N-1}(n)]^T$, where normally L+N<M. The center segment $W_c(n)$ includes the remaining coefficients in the vector W(n) and is denoted as a vector $W_c(n) = [w_L(n), w_{L+1}(n), \ldots w_{M-N-1}(n)]^T$.

Referring back to FIG. 4, a coefficient segmentation unit 430 receives the coefficient vector W(n) and uses only the front and back segments, $W_f(n)$ and $W_b(n)$. A power calculation unit 432 then receives and computes the power $P_{W_b}(n)$ of the coefficients in the back segment $W_b(n)$, as follows:

$$P_{W_b}(n) = |W_b(n)|^2 = W_b^T(n)W_b(n) = \sum_{i=L}^{M-1} w_i^2(n). \quad \text{Eq (8)}$$

A difference power calculation unit 434 receives and computes a difference power $P_{dW_f}(n)$ of the coefficients in the front segment $W_f(n)$, as follows:

$$P_{dW_f}(n) = |W_f(n) - W_f(n-J)|^2 = \sum_{i=0}^{L-1} [w_i(n) - w_i(n-J)]^2, \quad \text{Eq (9)}$$

where J is a positive integer. The difference power $P_{dW_f}(n)$ is indicative of changes in the power of the filter coefficients in the front segment $W_f(n)$ between the current sample period n and a prior sample period (n−J), which is J sample periods back from the current sample period. The difference power $P_{dW_f}(n)$ is thus a measure of changes in the filter coefficients with smaller indices. The difference power $P_{dW_f}(n)$ may also be expressed as:

$$P_{dW_f}(n) = |W_f(n)|^2 - |W_f(n-J)|^2.$$

An averaging unit 436 then receives and averages the difference power $P_{dW_f}(n)$. The average difference power $P_{adW_f}(n)$ may be computed as follows:

$$P_{adW_f}(n) = \frac{1}{I} \cdot \sum_{i=0}^{I-1} P_{dW_f}(n-i), \quad \text{Eq (10)}$$

where I is the number of difference power values being averaged (i.e., the number of sample periods over which the difference power is averaged). Equation (10) shows linear averaging being used to derive the average difference power $P_{adW_f}(n)$. However, exponential averaging may also be used, and this is within the scope of the invention.

A combiner unit 438 then receives and combines the power $P_{W_b}(n)$ of the coefficients in the back segment with the average difference power $P_{adW_f}(n)$ of the coefficients in the front segment to obtain a signal v(n), as follows:

$$v(n) = c_2 \cdot P_{adW_f}(n) + c_3 \cdot P_{W_b}(n), \quad \text{Eq (11)}$$

where $c_2$ and $c_3$ are positive scaling factors that determine the weights (i.e., the contributions) that $P_{W_b}(n)$ and $P_{adW_f}(n)$, respectively, will have on the step size u(n). The scaling factors $c_2$ and $c_3$ may also be determined empirically or via simulation to achieve the desired results. The signal v(n) represents the contribution that the characteristics of the filter coefficients will have on the step size u(n).

A multiplier 418 then receives and multiplies the scaled power ratio $c_1 P_r(n)/P_y(n)$ with the signal v(n) to obtain an initial step size u'(n), as follows:

$$u'(n) = \frac{c_1 P_r(n) \cdot v(n)}{P_y(n)}. \quad \text{Eq (12)}$$

Since the initial step size u'(n) may have a large range of values due to a wide range of values for the signals r(n) and y(n) and the filter coefficients, it is constrained to within a specified range of values.

A limiter 420 then receives and limits the initial step size u'(n) to provide the final step size u(n). The limiting may be expressed as:

$$u(n) = \begin{cases} u_{max} & \text{if} \quad u'(n) > u_{max}, \\ u'(n) & \text{if} \quad u_{max} \geq u'(n) \geq u_{min}, \quad \text{and} \\ u_{min} & \text{if} \quad u_{min} > u'(n), \end{cases} \quad \text{Eq (13)}$$

where $u_{max}$ and $u_{min}$ are respectively the maximum and minimum values allowed for the step size. These $u_{max}$ and $u_{min}$ values may be selected based on various considerations such as, for example, the fastest and slowest convergence rates deemed to be acceptable, the expected operating conditions, and so on.

In one embodiment, one set of maximum and minimum values $u_{max}$ and $u_{min}$ is used for all M filter coefficients. In another embodiment, a different set of $u_{max,i}$ and $u_{min,i}$ is used for each of the M filter coefficients. This embodiment allows the adjustment of each filter coefficient to be individually controlled. For this embodiment, the average difference power may be determined for each filter coefficient and used to set the step size $u_i(n)$ for that coefficient. In yet another embodiment, a different set of maximum and minimum values $u_{max}$ and $u_{min}$ is used for each group (or segment) of coefficients. For example, one set of $u_{max,f}$ and $U_{min,f}$ may be used for the coefficients in the front segment, one set of $u_{max,b}$ and $u_{min,b}$ may be used for the coefficients in the back segment, and another set of $u_{max,c}$ and $u_{min,c}$ may be used for the coefficients in the center segment.

Figure 5:
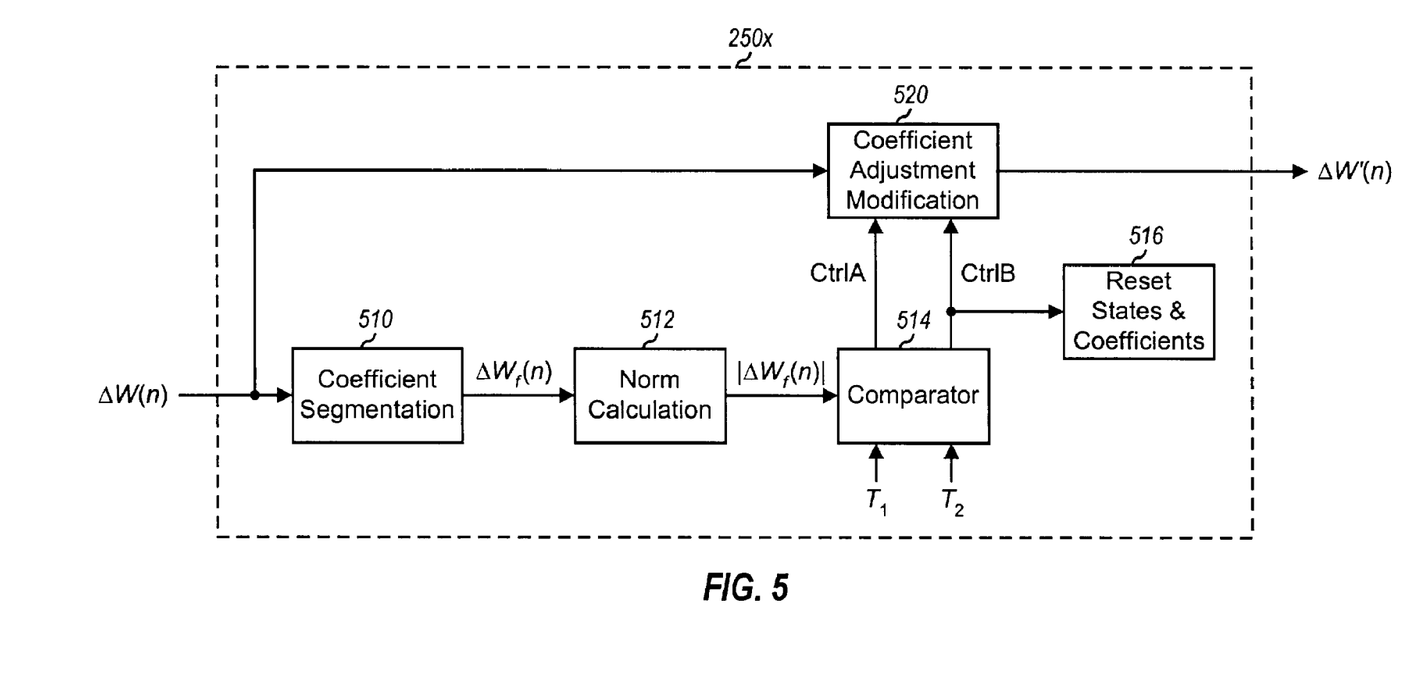
FIG. 5 is a diagram of a stability control unit.

FIG. 5 is a diagram of a stability control unit 250x, which is a specific embodiment of stability control unit 250 in FIG. 2. In an embodiment, the adjustment of the filter coefficients is constrained or limited to avoid instability (e.g., howling disaster) during abnormal situations. The maximum allowable value for the coefficient adjustments is set high enough so that the rate of convergence is not unduly affected.

As shown in FIG. 5, the coefficient adjustment vector $\Delta W(n)$ from adaptive algorithm 232 is provided to a segmentation unit 510 and a coefficient adjustment modification unit 520. Segmentation unit 510 segments the M coefficient adjustments in the vector $\Delta W(n)$ into a front segment that includes the coefficient adjustments for the first L filter coefficients. The front coefficient adjustment segment is denoted as a vector $\Delta W_f(n) = [\Delta w_0(n), \Delta w_1(n), \ldots \Delta w_{L-1}(n)]^T$.

A normal calculation unit 512 then receives and determines the norm of the coefficient adjustments in the front segment $\Delta W_f(n)$. The norm is indicative of the amount of adjustment for the filter coefficients and is a scalar. The norm of $\Delta W_f(n)$, which is denoted by $|\Delta W_f(n)|$, is equal to the sum of the magnitude of all coefficient adjustments in the vector $\Delta W_f(n)$. Unit 512 then provides a norm $|\Delta W_f(n)|$ for the front segment $\Delta W_f(n)$. Other parameters may also be used to quantify the amount of adjustment for the filter coefficients, and this is within the scope of the invention.

A comparator 514 then receives and compares the norm $|\Delta W_f(n)|$ against two threshold values, $T_1$ and $T_2$, where $T_1 < T_2$. Comparator 514 provides two controls, CtrlA and CtrlB, based on the results of the comparison. The comparison may be performed as follows. Initially, both CtrlA and CtrlB controls are reset (e.g., to logic low). Next, the norm $|\Delta W_f(n)|$ is compared against threshold $T_1$, and the CtrlA control is asserted (e.g., to logic high) if the norm is larger than $T_1$. Next, if the CtrlA control is asserted, then the norm $|\Delta W_f(n)|$ is compared against threshold $T_2$, and the CtrlB control is asserted if the norm is larger than $T_2$.

A unit 516 receives the CtrlB control and, if it is asserted, clears the internal buffers and the states of the adaptive filter, sets the coefficient vector W(n) to its initial values before any training starts, and sets the modified coefficient adjustment vector ΔW'(n) to zero. For abnormal cases (e.g., howling disaster), the coefficient adjustments may grow and become unstable. At the point in which the amount of adjustment for the coefficients becomes larger than threshold $T_2$, the filter coefficients are reset and the training can start over again.

Coefficient adjustment modification unit 520 receives the coefficient adjustment vector ΔW(n) and the CtrlA and CtrlB controls from comparator 514. Unit 520 then provides the modified coefficient adjustment vector ΔW'(n), which may be derived as follows:

$$\Delta W'(n) = \begin{cases} \Delta W(n) & \text{if } T_1 \geq |\Delta W(n)|, \\ \Delta W(n)/T_2 & \text{if } T_2 \geq |\Delta W(n)| > T_1, \text{ and} \\ 0 & \text{if } |\Delta W(n)| > T_2, \end{cases} \quad \text{Eq (14)}$$

As shown in equation (14), the modified coefficient adjustment vector ΔW'(n) is set equal to the initial coefficient adjustment vector ΔW(n) if the norm $|\Delta W_f(n)|$ is less than or equal to the threshold $T_1$. Thus, the initial coefficient adjustments are not modified at all if the norm $|\Delta W_f(n)|$ falls within an acceptable range defined by the threshold $T_1$. The initial coefficient adjustment vector ΔW'(n) is normalized by a factor of $T_2$ if the norm $|\Delta W_f(n)|$ is greater than the threshold $T_1$ but less than or equal to the threshold $T_2$. This ensures that the coefficient adjustments are not too large. Finally, the modified coefficient adjustment vector ΔW'(n) is set to zero if the norm $|\Delta W_f(n)|$ is greater than the threshold $T_2$. This prevents instability.

The modified coefficient adjustment vector ΔW'(n) is then provided by stability control unit 250x to adaptive algorithm 232 and used to update the filter coefficients, as shown in equation (6).

In the embodiment shown in FIG. 5, the norm is computed for the front segment $\Delta W_f(n)$ of coefficient adjustments. In another embodiment, the norm may be computed for all coefficient adjustments in the vector ΔW(n).

Echo cancellation system 200 provides several advantages over conventional echo cancellation systems such as the one shown in FIG. 1. First, the use of a variable and adaptive step size u(n) avoids the need for a double-talk detector to detect near-end only talk, far-end only talk, and double talk. As noted above, it is difficult to obtain accurate double-talk detection using currently available double-talk detection schemes. This is especially true under challenging operating environments. With the adaptive step size provided herein, the adaptive filter may be operated to adapt at all times, even when double-talk or only near-end talk is present. However, in such situations, the step size is automatically set smaller so that the filter coefficients are updated more slowly, if at all. Second, the use of a stability control unit prevents deleterious effects under abnormal operating scenarios.

Figure 7:
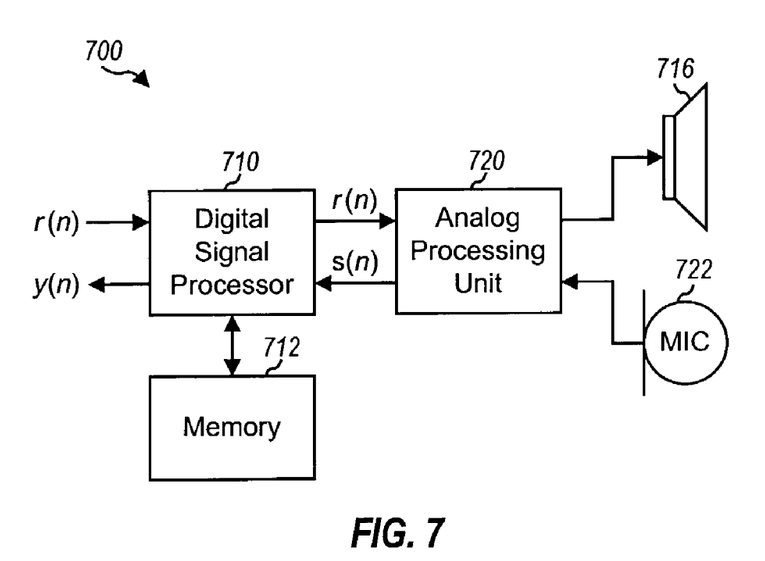
FIG. 7 is a diagram of an implementation of the echo cancellation system.

FIG. 7 is a diagram of an implementation of an echo cancellation system 700. In this implementation, system 700 includes a digital signal processor (DSP) 710, a memory 712, an analog processing unit 720, a speaker 718, and a microphone 722. Digital signal processor 710 may be designed to implement various processing units for echo suppression, such as adaptive filter 230, step size control unit 240, and stability control unit 250 shown in FIG. 2. Memory 712 provides storage for program codes and data used by signal processor 710. Analog processing unit 720 performs the analog processing and may include D/A converter 212 and power amplifier 214 in the output path and amplifier 224 and A/D converter 226 in the input path. Digital signal processor 710 may then implement the remaining processing units of system 200.

The echo suppression techniques described herein may be implemented by various means. For example, these techniques may be implemented in hardware, software, or a combination thereof. For a hardware implementation, the processing units used to implement any one or a combination of the techniques described herein (e.g., adaptive filter 230, step size control unit 240, and stability control unit 250) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the echo suppression techniques may be implemented with modules (e.g., procedures, functions, and so on) that perform the functions described herein. The software codes may be stored in a memory unit (e.g., memory 712 in FIG. 7) and executed by a processor (e.g., digital signal processor 710). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An acoustic echo canceller comprising:

an adaptive filter operative to receive a reference signal and a near-end signal, derive an estimate of echo in the near-end signal using a digital filter, and cancel the echo estimate from the near-end signal to provide an output signal;

a step size control unit operative to receive the reference and output signals and provide a step size signal indicative of one or more step sizes to be used to adjust coefficients of the digital filter, wherein the one or more step sizes are determined based on the coefficients, characteristics of the reference and output signals; and a stability control unit operative to receive initial adjustments for the coefficients of the digital filter and provide modified adjustments, and wherein the coefficients are updated based on the modified adjustments; and wherein the step size is determined by the following equations:

$$u'(n) = \frac{c_1 P_r(n) \cdot v(n)}{P_y(n)}$$

where u'(n) is the step size;
$P_r(n)$ is the average power of the reference signal;
$P_y(n)$ is the average power of the output signal;
$c_1$ is a scaling factor; and wherein a first combiner receives and combines the power $P_{W_b}(n)$ of the coefficients in the back segment with the average difference power $P_{adW_f}(n)$ of the coefficients in the front segment to obtain a signal v(n).

2. The echo canceller of claim 1, wherein the one or more step sizes are proportional to amplitude of the reference signal.

3. The echo canceller of claim 1, wherein the one or more step sizes are inversely proportional to amplitude of the output signal.

4. The echo canceller of claim 1, wherein the step size control unit is further operative to receive the coefficients of the digital filter, and wherein the one or more step sizes are further determined based on characteristics of the coefficients.

5. The echo canceller of claim 4, wherein the one or more step sizes are proportional to changes in the coefficients.

6. The echo canceller of claim 5, wherein the changes in the coefficients are quantified by a difference in power of the coefficients at two different time instants.

7. The echo canceller of claim 1, wherein one step size is used for each group of one or more coefficients.

8. The echo canceller of claim 1, wherein $$v(n) = c_2 \cdot P_{adW_f}(n) + c_3 \cdot P_{W_b}(n)$$

where $c_2$ and $c_3$ are positive scaling factors; and $$P_{adW_f}(n) = \frac{1}{I} \cdot \sum_{i=0}^{I-1} P_{dW_f}(n-i)$$

where I is the number of power difference $P_{dWf}$; and $$P_{dW_f}(n) = |W_f(n) - W_f(n-J)|^2 = \sum_{i=0}^{L-1} [w_i(n) - w_i(n-J)]^2$$

where J is a positive integer;

$$P_{W_b}(n) = |W_b(n)|^2 = W_b^T(n) W_b(n) = \sum_{i=L}^{M-1} w_i^2(n)$$

where M is the number of the coefficients;

L is a start coefficient count of the coefficients and L<M; and $$\Delta W'(n) = \begin{cases} \Delta W(n) & \text{if } T_1 \geq |\Delta W(n)|, \\ \Delta W(n)/T_2 & \text{if } T_2 \geq |\Delta W(n)| > T_1, \text{ and} \\ 0 & \text{if } |\Delta W(n)| > T_2, \end{cases}$$

where $\Delta W(n)$ is the initial adjustments for the coefficients;
$\Delta W'(n)$ is the modified adjustments; and
T1 and T2 are coefficient adjustment thresholds; and $$W(n) = W(n-1) + \Delta W'(n)$$

where W(n) is the coefficient.

9. The echo canceller of claim 1, wherein the stability control unit is operative to reduce the initial adjustments for the coefficients if amount of coefficient adjustment exceeds a first threshold value.

10. The echo canceller of claim 9, wherein the stability control unit is further operative to set the digital filter coefficients to initial values and an adjustment for the digital filter coefficients to zero if the coefficient adjustment exceeds a second threshold value.

11. The echo canceller of claim 9, wherein the amount of coefficient adjustment is quantified by a norm of the initial adjustments for a set of coefficients.

12. The echo canceller of claim 1, wherein the adjustable filter is implemented as a finite impulse response (FIR) filter.

13. The echo canceller of claim 1, wherein the adaptive filter implements a normalized least mean square (NLMS) algorithm.

14. A method for canceling acoustic echo, comprising:
deriving an estimate of echo in a near-end signal based on a reference signal and using a digital filter;
canceling the echo estimate from the near-end signal to provide an output signal;
determining one or more step sizes to be used for updating coefficients of the digital filter, wherein the one or more step sizes are determined based on characteristics of the coefficients, the reference and output signals;
updating the coefficients of the digital filter based on the reference and near-end signal and the one or more step sizes; and
receiving initial adjustments for the coefficients of the digital filter and provide modified adjustments, and wherein the coefficients are updated based on the modified adjustments; and
wherein the step size is determined by the following equations:

$$u'(n) = \frac{c_1 P_r(n) \cdot v(n)}{P_y(n)}$$

where u'(n) is the step size;
$P_r(n)$ is the average power of the reference signal;
$P_y(n)$ is the average power of the output signal;
$c_1$ is a scaling factor; and wherein a first combiner receives and combines the power $P_{W_b}(n)$ of the coefficients in the back segment with the average difference power $P_{adW_f}(n)$ of the coefficients in the front segment to obtain a signal v(n).

15. The method of claim 14, wherein the one or more step sizes are further determined based on characteristics of the coefficients, wherein:

$$v(n) = c_2 \cdot P_{adW_f}(n) + c_3 \cdot P_{W_b}(n)$$

where $c_2$ and $c_3$ are positive scaling factors; and $$P_{adW_f}(n) = \frac{1}{I} \cdot \sum_{i=0}^{I-1} P_{dW_f}(n-i)$$

where I is the number of power difference $P_{dWf}$; and $$P_{dW_f}(n) = |W_f(n) - W_f(n-J)|^2 = \sum_{i=0}^{L-1} [w_i(n) - w_i(n-J)]^2$$

where J is a positive integer;

$$P_{W_b}(n) = |W_b(n)|^2 = W_b^T(n)W_b(n) = \sum_{i=L}^{M-1} w_i^2(n)$$

where M is the number of the coefficients;
L is a start coefficient count of the coefficients and L<M; and $$\Delta W'(n) = \begin{cases} \Delta W(n) & \text{if} \quad T_1 \geq |\Delta W(n)|, \\ \Delta W(n)/T_2 & \text{if} \quad T_2 \geq |\Delta W(n)| > T_1, \text{ and} \\ 0 & \text{if} \quad |\Delta W(n)| > T_2, \end{cases}$$

where $\Delta W(n)$ is the initial adjustments for the coefficients;
$\Delta W'(n)$ is the modified adjustments; and
T1 and T2 are coefficient adjustment thresholds; and $$W(n)=W(n-1)+\Delta W'(n)$$

where W(n) is the coefficient.

16. The method of claim 14, further comprising:
deriving initial adjustments for the coefficients based on the reference and near-end signals and the one or more step sizes;
modifying the initial adjustments, if necessary, to prevent instability; and
updating the coefficients based on the modified adjustments.

17. The method of claim 16, wherein the modifying includes
reducing the initial adjustments for the coefficients if amount of coefficient adjustment exceeds a first threshold value.

18. The method of claim 16, wherein the modifying includes
setting the modified adjustments for the coefficients to zero if amount of coefficient adjustment exceeds a second threshold value.

19. An apparatus, comprising:
means for deriving an estimate of echo in a near-end signal based on a reference signal and using a digital filter;
means for canceling the echo estimate from the near-end signal to provide an output signal;
means for determining one or more step sizes to be used for updating coefficients of the digital filter, wherein the one or more step sizes are determined based on characteristics of the reference and output signals;

means for updating the coefficients of the digital filter based on the reference and near-end signals and the one or more step sizes; and
means for receiving initial adjustments for the coefficients of the digital filter and provide modified adjustments and wherein the coefficients are updated based on the modified adjustments; and
wherein the step size is determined by the following equations:

$$u'(n) = \frac{c_1 P_r(n) \cdot v(n)}{P_y(n)}$$

where u'(n) is the step size;
$P_r(n)$ is the average power of the reference signal;
$P_y(n)$ is the average power of the output signal;
$c_1$ is a scaling factor; and $$v(n)=c_2 \cdot P_{adW_f}(n)+c_3 \cdot P_{W_b}(n)$$

where $c_2$ and $c_3$ are positive scaling factors; and $$P_{adW_f}(n) = \frac{1}{I} \cdot \sum_{i=0}^{I-1} P_{dW_f}(n-i)$$

where I is the number of power difference $P_{dWf}$; and $$P_{dW_f}(n) = |W_f(n) - W_f(n-J)|^2 = \sum_{i=0}^{L-1} [w_i(n) - w_i(n-J)]^2$$

where J is a positive integer;

$$P_{W_b}(n) = |W_b(n)|^2 = W_b^T(n)W_b(n) = \sum_{i=L}^{M-1} w_i^2(n)$$

where M is the number of the coefficients;
L is a start coefficient count of the coefficients and L<M; and $$\Delta W'(n) = \begin{cases} \Delta W(n) & \text{if} \quad T_1 \geq |\Delta W(n)|, \\ \Delta W(n)/T_2 & \text{if} \quad T_2 \geq |\Delta W(n)| > T_1, \text{ and} \\ 0 & \text{if} \quad |\Delta W(n)| > T_2, \end{cases}$$

where $\Delta W(n)$ is the initial adjustments for the coefficients;
$\Delta W'(n)$ is the modified adjustments; and
T1 and T2 are coefficient adjustment thresholds; and $$W(n)=W(n-1)+\Delta W'(n)$$

where W(n) is the coefficient.

20. The apparatus of claim 19, further comprising:
means for deriving initial adjustments for the coefficients based on the reference and near-end signals and the one or more step sizes; and
means for modifying the initial adjustments, if necessary, to prevent instability; and
means for updating the coefficients based on the modified adjustments.

21. A digital signal processor comprising:
   an adaptive filter operative to receive a reference signal and a near-end signal, derive an estimate of echo in the near-end signal using a digital filter, and cancel the echo estimate from the near-end signal to provide an output signal;
   a step size control unit operative to receive the reference and output signals and provide a step size signal indicative of one or more step sizes to be used to adjust coefficients of the digital filter, wherein the one or more step sizes are determined based on characteristics of the reference and output signals; and
   a stability control unit operative to receive initial adjustments for the coefficients of the digital filter and provide modified adjustments, and wherein the coefficients are undated based on the modified adjustments; and
   wherein the step size is determined by the following equations:

$$u'(n) = \frac{c_1 P_r(n) \cdot v(n)}{P_y(n)}$$

where u'(n) is the step size;
$P_r(n)$ is the average power of the reference signal;
$P_y(n)$ is the average power of the output signal;
$c_1$ is a scaling factor;
wherein a first combiner receives and combines the power $P_{W_b}(n)$ of the coefficients in the back segment with the average difference power $P_{adW_f}(n)$ of the coefficients in the front segment to obtain a signal v(n).

22. The digital signal processor of claim 21, wherein $$v(n) = c_2 \cdot P_{adW_f}(n) + c_3 \cdot P_{W_b}(n)$$

where $c_2$ and $c_3$ are positive scaling factors; and $$P_{adW_f}(n) = \frac{1}{I} \cdot \sum_{i=0}^{I-1} P_{dW_f}(n-i)$$

where I is the number of power difference $P_{dW_f}$; and $$P_{dW_f}(n) = |W_f(n) - W_f(n-J)|^2 = \sum_{i=0}^{L-1} [w_i(n) - w_i(n-J)]^2$$

where J is a positive integer;

$$P_{W_b}(n) = |W_b(n)|^2 = W_b^T(n)W_b(n) = \sum_{i=L}^{M-1} w_i^2(n)$$

where M is the number of the coefficients;
   L is a start coefficient count of the coefficients and L<M; and $$\Delta W'(n) = \begin{cases} \Delta W(n) & \text{if} \quad T_1 \geq |\Delta W(n)|, \\ \Delta W(n)/T_2 & \text{if} \quad T_2 \geq |\Delta W(n)| > T_1, \text{ and} \\ 0 & \text{if} \quad |\Delta W(n)| > T_2, \end{cases}$$

where $\Delta W(n)$ is the initial adjustments for the coefficients;
$\Delta W'(n)$ is the modified adjustments; and
T1 and T2 are coefficient adjustment thresholds; and $$W(n) = W(n-1) + \Delta W'(n),$$

where W(n) is the coefficient.

* * * * *